US006548039B1

(12) United States Patent
Duyvesteyn et al.

(10) Patent No.: US 6,548,039 B1
(45) Date of Patent: Apr. 15, 2003

(54) PROCESSING AQUEOUS TITANIUM SOLUTIONS TO TITANIUM DIOXIDE PIGMENT

(75) Inventors: Willem P. C. Duyvesteyn, Reno, NV (US); Timothy Malcome Spitler, Fernley, NV (US); Bruce James Sabacky, Reno, NV (US); Andrew Vince, Moranbah (AU); Jan Prochazka, Reno, NV (US)

(73) Assignee: Altair Nanomaterials Inc., Reno, NV (US)

( * ) Notice: Subject to any disclaimer, the term of this patent is extended or adjusted under 35 U.S.C. 154(b) by 0 days.

(21) Appl. No.: 09/503,636

(22) Filed: Feb. 14, 2000

Related U.S. Application Data

(60) Provisional application No. 60/147,702, filed on Aug. 6, 1999, provisional application No. 60/141,114, filed on Jun. 24, 1999, and provisional application No. 60/141,057, filed on Jun. 24, 1999.

(51) Int. Cl.[7] ............................................. C01G 23/047
(52) U.S. Cl. ........................ 423/610; 423/611; 423/612; 423/615
(58) Field of Search ........................... 423/76, 610, 611, 423/612, 615, 616

(56) References Cited

U.S. PATENT DOCUMENTS

| | | | |
|---|---|---|---|
| 3,903,239 A | * | 9/1975 | Berkovich ................... 423/92 |
| 3,935,094 A | | 1/1976 | Bergeron et al. |
| 3,941,583 A | | 3/1976 | Martin et al. |
| 3,961,005 A | | 6/1976 | Sparks |
| 3,961,940 A | | 6/1976 | Fukushima et al. |
| 3,966,455 A | | 6/1976 | Taylor |
| 3,967,954 A | | 7/1976 | Chen |
| 3,996,332 A | | 12/1976 | Elger et al. |
| 4,012,338 A | * | 3/1977 | Urwin ......................... 252/461 |
| 4,065,544 A | * | 12/1977 | Hamling et al. ............. 423/252 |
| 4,082,832 A | | 4/1978 | Watanabe et al. |
| 4,085,190 A | | 4/1978 | Shiah |
| 4,089,675 A | | 5/1978 | Preston et al. |
| 4,097,574 A | | 6/1978 | Auger et al. |

(List continued on next page.)

FOREIGN PATENT DOCUMENTS

| | | |
|---|---|---|
| DE | 197 25 616 C | 11/1998 |
| EP | 0 016 583 A | 10/1980 |
| EP | 0 186 370 A2 | 2/1986 |
| EP | 0 356 132 | 2/1990 |
| GB | 2 166 126 A | 4/1986 |
| WO | WO 95/08004 | 3/1995 |
| WO | WO 96/24555 | 8/1996 |
| WO | WO 97/10185 A | 3/1997 |
| WO | WO 97/30130 A | 8/1997 |

OTHER PUBLICATIONS

Patent Abstracts of Japan, vol. 007, No. 086 (C–161), Apr. 9, 1983 & JP 58 015031 A (Taijirou Okabe), Jan. 28, 1983 abstract.

*Primary Examiner*—Stanley S. Silverman
*Assistant Examiner*—Cam N. Nguyen
(74) *Attorney, Agent, or Firm*—Brinks Hofer Gilson & Lione; G. Peter Nichols

(57) ABSTRACT

A hydrometallurgical process is provided for producing pigment grade $TiO_2$ from titanium containing solutions. Generally, the solution is an aqueous solution. The process includes hydrolyzing the solution via complete evaporation in well-controlled conditions of temperature to form titanium oxide of well-defined characteristics. The hydrolyzing can be achieved by spray hydrolysis in a spray dryer. After hydrolyzing, the titanium oxide is calcined to transform the titanium oxide to the desired form of titanium dioxide. The titanium dioxide can be either anatase or rutile. Following calcination, the titanium dioxide is milled to provide the desired particle size distribution and then finished.

34 Claims, 7 Drawing Sheets

U.S. PATENT DOCUMENTS

| | | | |
|---|---|---|---|
| 4,107,264 A | 8/1978 | Nagasubramanian et al. | |
| 4,120,694 A | 10/1978 | Elger et al. | |
| 4,152,252 A | 5/1979 | Tolley et al. | |
| 4,158,041 A | 6/1979 | Tolley | |
| 4,168,297 A | 9/1979 | Nagasubramanian et al. | |
| 4,172,878 A | 10/1979 | Tolley | |
| 4,174,274 A | 11/1979 | Tolley et al. | |
| 4,174,963 A | 11/1979 | Tolley | |
| 4,175,110 A | 11/1979 | Tolley | |
| 4,175,952 A | 11/1979 | Tolley | |
| 4,178,176 A | 12/1979 | Tolley | |
| 4,183,768 A | 1/1980 | Knapp et al. | |
| 4,199,552 A | 4/1980 | Rado | |
| 4,206,021 A | 6/1980 | Rivory | |
| 4,230,542 A | 10/1980 | Traini et al. | |
| 4,269,619 A | 5/1981 | Keil et al. | |
| 4,269,809 A | 5/1981 | Tolley et al. | |
| 4,288,417 A | 9/1981 | Rahm et al. | |
| 4,288,418 A | 9/1981 | Davis et al. | |
| 4,304,758 A | 12/1981 | Rieck et al. | |
| 4,313,913 A | 2/1982 | Panek et al. | |
| 4,359,449 A | 11/1982 | Hard et al. | |
| 4,384,883 A | 5/1983 | Fensom | |
| 4,389,391 A | 6/1983 | Dunn, Jr. | |
| 4,390,365 A | 6/1983 | Hard et al. | |
| 4,401,467 A | 8/1983 | Jordan | |
| 4,468,248 A | 8/1984 | Megy | |
| 4,619,815 A * | 10/1986 | Robinson | 423/74 |
| 4,735,869 A * | 4/1988 | Morita | 428/702 |
| 4,842,832 A * | 6/1989 | Inoue et al. | 423/211 |
| 4,923,682 A * | 5/1990 | Roberts et al. | 423/611 |
| 4,944,936 A * | 7/1990 | Lawhorne | 423/612 |
| 4,986,742 A | 1/1991 | Denecker et al. | |
| 5,061,460 A | 10/1991 | Watanabe et al. | |
| 5,068,056 A * | 11/1991 | Robb | 252/313.1 |
| 5,068,093 A | 11/1991 | Mauer | |
| 5,104,445 A | 4/1992 | Dubrovsky et al. | |
| 5,106,489 A | 4/1992 | Schmidt et al. | |
| 5,108,739 A * | 4/1992 | Kurihara et al. | 424/76.1 |
| 5,135,652 A | 8/1992 | Boateng | |
| 5,192,443 A | 3/1993 | Delloye et al. | |
| 5,224,986 A | 7/1993 | Mostert et al. | |
| 5,225,178 A | 7/1993 | O'Donnell et al. | |
| 5,264,033 A * | 11/1993 | Noda et al. | 106/82 |
| 5,378,438 A | 1/1995 | Leary | |
| 5,397,375 A | 3/1995 | O'Donnell et al. | |
| 5,399,751 A | 3/1995 | Gentry et al. | |
| 5,403,513 A * | 4/1995 | Sato et al. | 252/309 |
| 5,427,749 A | 6/1995 | Hollitt et al. | |
| 5,441,712 A | 8/1995 | Duyvesteyn et al. | |
| 5,456,899 A * | 10/1995 | Inchley | 423/611 |
| 5,482,691 A | 1/1996 | O'Donnell et al. | |
| 5,490,976 A | 2/1996 | Rennie et al. | |
| 5,562,763 A * | 10/1996 | Bruckner et al. | 106/403 |
| 5,595,347 A | 1/1997 | Walpole | |
| 5,601,630 A | 2/1997 | Hoecker | |
| 5,679,131 A | 10/1997 | Obushenko | |
| 5,688,439 A * | 11/1997 | Chopin et al. | 252/309 |
| 5,698,177 A * | 12/1997 | Pratsinis et al. | 423/613 |
| 5,698,205 A | 12/1997 | Brückner et al. | |
| 5,714,260 A * | 2/1998 | Okuda et al. | 428/402 |
| 5,730,774 A | 3/1998 | Hollitt et al. | |
| 5,730,795 A | 3/1998 | Herkimer | |
| 5,770,310 A * | 6/1998 | Noguchi et al. | 428/403 |
| 5,826,162 A | 10/1998 | Aral et al. | |
| 5,833,892 A | 11/1998 | Gurav et al. | |
| 5,840,111 A * | 11/1998 | Wiederhoft et al. | 106/436 |
| 6,001,326 A * | 12/1999 | Kim et al. | 423/598 |
| 6,037,289 A | 3/2000 | Chopin | |
| 6,099,634 A * | 8/2000 | Uenishi et al. | 106/436 |

\* cited by examiner

PROCESSING AQUEOUS TITANIUM SOLUTIONS TO TITANIUM DIOXIDE PIGMENT

This application claims priority from U.S. Ser. No. 60/141,057 filed Jun. 24, 1999 U.S. Ser. No. 60/147,702 filed Aug. 6, 1999, U.S. Ser. No. 60/141,114 filed Jun. 24, 1999, and U.S. application Ser. No. 09/500,207, U.S. Pat. No. 6,375,923 the entire contents of each are incorporated herein by reference.

The present invention relates to a process for producing titanium dioxide of a pigment grade, parts of the process, and the product of the process. In particular, the present invention relates to the processing of aqueous titanium solutions derived from treatment of titanium ores to $TiO_2$ pigment. The process includes a novel combination of operational steps to economically produce a high quality grade titanium dioxide pigment.

BACKGROUND OF THE INVENTION

Titanium dioxide is considered the principal white pigment of commerce. It has exceptionally high refractive index, negligible color, and is quite inert. Titanium dioxide may be present in either of two predominant forms, anatase or rutile. For the majority of commercial applications, rutile is the desired form.

There are two main processes for making raw pigmentary titanium dioxide, the sulfate process and the chloride process. The sulfate process is based on the digestion of ilmenite or titania slag in concentrated sulfuric acid. After iron removal as iron sulfate, the solution is heated and diluted with water. The titanium hydrolyzes, forming a titanium oxysulfate precipitate, which is further treated to produce $TiO_2$ pigment. The chloride process relies on chlorination of low-iron, titanium containing ore or intermediate products to form $TiCl_4$, followed by the gas-phase oxidation of $TiCl_4$.

Alternative methods based on hydrochloric acid leaching of titaniferous ore have been proposed. One example is disclosed in U.S. Pat. No. 3,903,239. There, the process includes the hydrolysis of titanium oxide from a chloride solution by heating and dilution. The hydrolysis step is similar to the hydrolysis procedure conventionally used in the sulfate process.

Hydrolysis by heating and dilution with water presents a number of disadvantages. It creates large volumes of dilute acid solutions that are expensive to recycle and the disposal of which presents environment problems. The very fine, hydrolyzed $TiO_2$ has to be removed from a large volume of solution, generally by filtration. The conditions of hydrolysis have to be adjusted to make the resulting suspension filterable, which limits flexibility in choosing hydrolysis conditions. Chemical control additives can be introduced in solution prior to hydrolysis to influence the characteristics of the product, but the additives are generally not homogeneously distributed over the mass of the $TiO_2$ product, and their effectiveness is less than optimal.

The present invention makes it possible to produce a high quality titanium dioxide pigment from an aqueous titanium solution without the disadvantages mentioned. It is particularly well suited when a titanium solution of high purity is available. For example, the solution can be derived from the process disclosed in U.S. application Ser. No. 60/141,114 filed on Jun. 24, 1999 and from U.S. application Ser. No. 09/500,207, U.S. Pat. No. 6,375,923 the entire contents of each are incorporated herein by reference.

SUMMARY OF THE INVENTION

The present invention relates to an economical hydrometallurgical process for producing pigment grade $TiO_2$ from aqueous titanium solutions. The solutions may be derived from any of several sources, but are generally derived from processing mineral ores and, in particular, ilmenite ore. The processing to produce the solutions can be, for instance, a leaching or dissolution process, followed by any of several means for solution purification. For example, the solution can be derived from the process disclosed in U.S. application Ser. No. 60/141,114 filed on Jun. 24, 1999 and from U.S. application Ser. No. 09/500,207, U.S. Pat. No. 6,375,923 the entire contents of each are incorporated herein by reference. Alternatively, the processing to produce the solution can be from a chlorination process where the $TiCl_4$ is dissolved in water or a hydrochloric acid solution. Furthermore, the process according to this invention is not limited to solutions containing titanium and chloride, but titaniferous sulfate and titaniferous nitrate solutions can also be used.

In one embodiment, the solutions are aqueous titanium chloride solutions and are comprised of water, hydrochloric acid, titanium oxychlorides, and titanium chlorides. These solutions may vary widely in composition with the respect to the hydrochloric acid content and the titanium content.

The titanium chloride solutions are first converted to a titanium oxide solid in a controlled temperature, total evaporation process at a temperature higher than the boiling point of the solution, but below the temperature where there is significant crystal growth.

The process includes evaporation of the solution in a controlled manner, hydrolysis to form amorphous titanium oxide, further evaporation and drying of the product. It generally involves the formation of a thin film of titanium oxide. The process is preferably effected by spraying and is referred to herein as spray hydrolysis. Spray hydrolysis can be accomplished in a spray dryer, or any other suitable piece of equipment. The gas phase formed as a result of evaporation, contains acid and water, and can be further processed to regenerate the acid (hydrochloric, sulfuric, or nitric acid).

The titanium oxide is then calcined at an elevated temperature to transform the oxide to a desired crystalline form of titanium dioxide suitable for use as a white pigment. The desired cyrstalline form is usually the rutile form of titanium dioxide but, depending upon the type of chemical additives used, the anatase form can also be produced in this process.

Following calcination, the titanium dioxide is milled to produce the desired particle size distribution suitable for use as a white pigment. The milling may be by wet milling.

Finally, the milled titanium dioxide is dewatered, usually by filtration, and optionally dried, usually by spray drying, to yield a final titanium dioxide white pigment.

The advantages of the process according to the present invention include a high quality titanium dioxide pigment, readily controlled physical and chemical characteristics of the pigment product, and low cost processing, since dilution of the solution is avoided and the acid in the gases can be recycled.

DETAILED DESCRIPTION OF THE INVENTION

Figure 1:
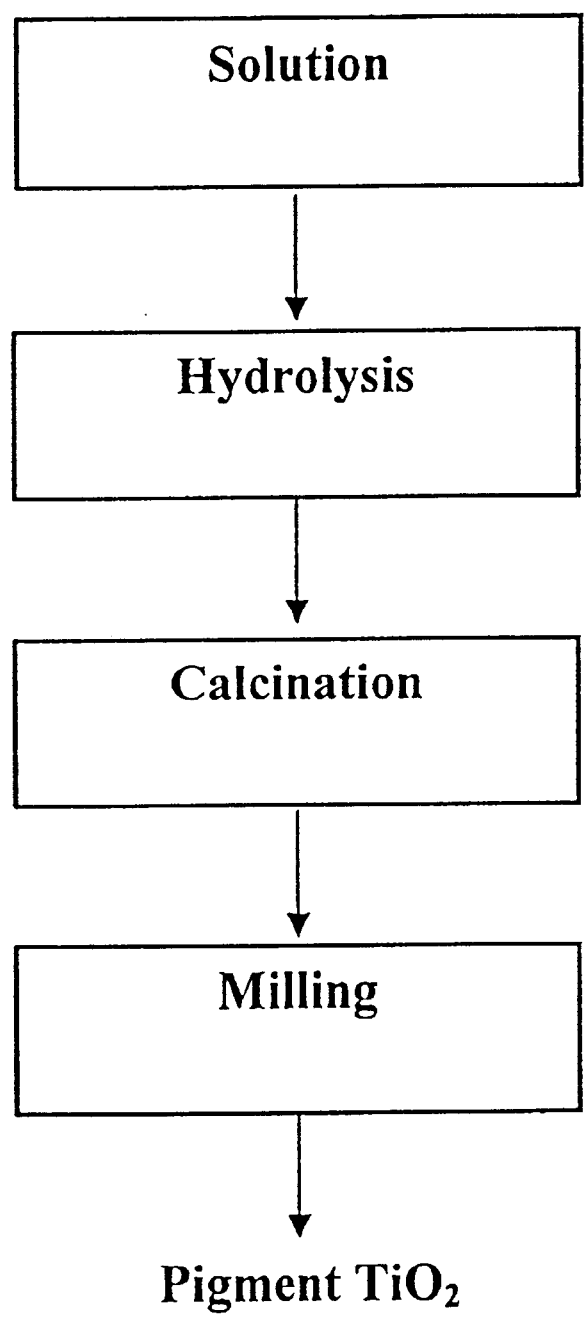
FIG. 1 is a flow sheet of the general aspect of the process according to the invention.

The present invention is a hydrometallurgical process for producing pigment grade $TiO_2$ from aqueous titanium solutions. Referring now to FIG. 1, the general process according to the present invention is shown. In this process, a solution containing titanium is hydrolyzed by complete evaporation. The hydrolysis product is further calcined and milled to provide a commercial grade titanium dioxide pigment.

Titanium Solutions

The solutions may be derived from any of several sources, but are generally derived from processing mineral ores and, in particular, ilmenite ore or ilmenite mineral concentrates. The processing to produce the solutions can be, for instance, a leaching or dissolution process, followed by any of several means for solution purification. For example, the solution can be derived from the process disclosed in U.S. patent application Ser. No. 60/141,114 and Ser. No. 09/500,207, U.S. Pat. No. 6,375, entire contents of which are incorporated herein by reference. Solutions produced by this process contain low levels of impurities. Preferably, the ratio of the impurity content of coloring impurities (such as Fe, Cr, Ni, V, etc.) to the amount of Ti in solution is such that the hydrolysis product contains no more than 20 ppm of these impurities. For example if a final $TiO_2$ product purity of 10 ppm Fe is require, a starting solution containing with 50 gpl Ti should contain no more than 3–4 ppm Fe impurity, assuming that all Fe reports to the $TiO_2$ product. Such low solution impurity concentrations are not readily achieved using conventional processing technologies.

In one embodiment, the solutions are aqueous titanium chloride solutions and are comprised of water, hydrochloric acid, titanium oxychlorides, and titanium chlorides. These solutions may vary widely in composition with the respect to the hydrochloric acid content and the titanium content.

While the titanium solutions may be derived from a variety of sources, the present invention will now be particularly described with reference to aqueous titanium chloride solutions. It is to be understood that the reference to aqueous titanium chloride solutions is not meant to limit the applicability of the process of the present invention but is meant only to simplify the description.

The aqueous titanium chloride solutions are comprised of water, hydrochloric acid, and titanium oxychlorides and titanium chlorides. The solutions may vary widely in composition with the respect to the hydrochloric acid content and the titanium content. The content of the solution may vary from about 3 weight % acid to as high as 40 weight percent hydrochloric acid and the titanium content may vary from as low as 30 grams per liter of titanium to as high as 200 grams per liter titanium.

The source of the titanium chloride solution may be from any known process in which chloride is used during the processing of titanium containing material. For example, the titanium chloride solution may be derived from the processing of titaniferous ores using hydrochloric acid.

Alternatively, the titanium chloride solution may be derived from the conventional chlorination of titanium material where $TiCl_4$ is produced. In this instance, the $TiCl_4$ can readily be dissolved in water to form the titanium chloride solution. Alternatively, titanyl sulfate can readily be dissolved in a nitric acid, sulfuric acid, or hydrochloric acid solution.

Additionally and optionally, minor quantities of chemical control agents may be introduced into the titanium chloride solution to control the physical and mineralogical characteristics of the solid titanium dioxide product resulting from the conversion of the solutions. These chemical control and seeding agents can be, but are not limited to, the chloride salts of lithium, sodium, potassium, aluminum, tin, and zinc. Carbonate, fluoride, sulfate and other suitable salts of the same aforementioned elements may be used. Additionally, phosphoric acid and phosphate salts of the aforementioned elements may be used. Furthermore, a number of organic additives may also be used. They include, but are not limited to: organic acids such oxalic, citric, stearic, etc.; salts from these organic acids and inorganic compounds; other organic additives, such as polyacrylates, glycols, siloxane and their compounds.

Vacuum Evaporation

Figure 2:
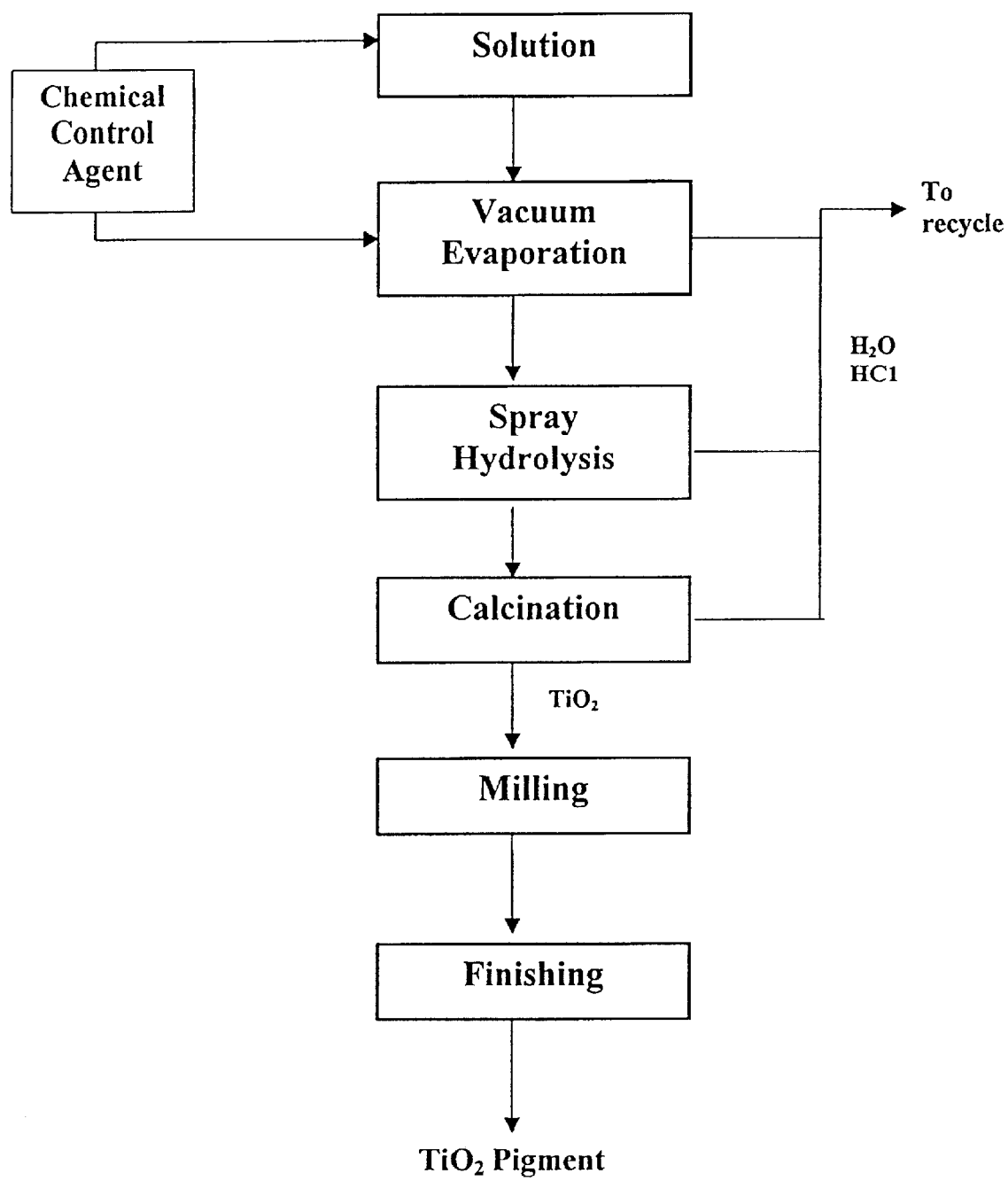
FIG. 2 is a flow sheet of a preferred embodiment of the process according to the present invention, including vacuum evaporation of the solution before hydrolysis, followed by spray hydrolysis.

Referring to FIG. 2, a preferred embodiment of the present invention is shown. In this embodiment, the titanium chloride solution, with or without chemical control agents added, may be concentrated with respect to titanium content by any of several methods of vacuum evaporation. The solutions can be vacuum evaporated under conditions to inhibit formation of titanium dioxide while removing excess water and HCl as vapors.

Hydrolysis

Hydrolysis is accomplished in a controlled temperature, total evaporation process at a temperature higher than the boiling point of the solution, but lower than the temperature where significant crystal growth occurs. This temperature is generally in the range from about 120° C. to about 350° C., preferably in the range from about 200° C. to about 250° C.

In this process, any chemical control additives added to the solution are homogeneously distributed throughout the solid product.

Preferably, hydrolysis is accomplished by spraying the solution while it is heated at a temperature in the range from about 120° C. to about 350° C. and preferably in the range from about 200° C. to about 250° C. This process is called spray hydrolysis. Spray hydrolysis can be effected in a spray dryer, or any other piece of equipment that can provide controlled evaporation and hydrolysis conditions.

Preferably, the conditions of spray hydrolysis will be chosen to produce hollow thin-film spheres or parts of spheres having a diameter in the range from about 1 to about 100 $\mu$m and a film thickness in the range of about 0.1 to 5 $\mu$m, most preferably in the range of about 0.2 $\mu$m to about 1 $\mu$m. The resulting titanium oxide will be an amorphous, polymeric titanium oxide particle. After calcination and milling, these spheres yield elementary crystalline particles with a narrow size distribution corresponding to high quality pigment.

Figure 4:
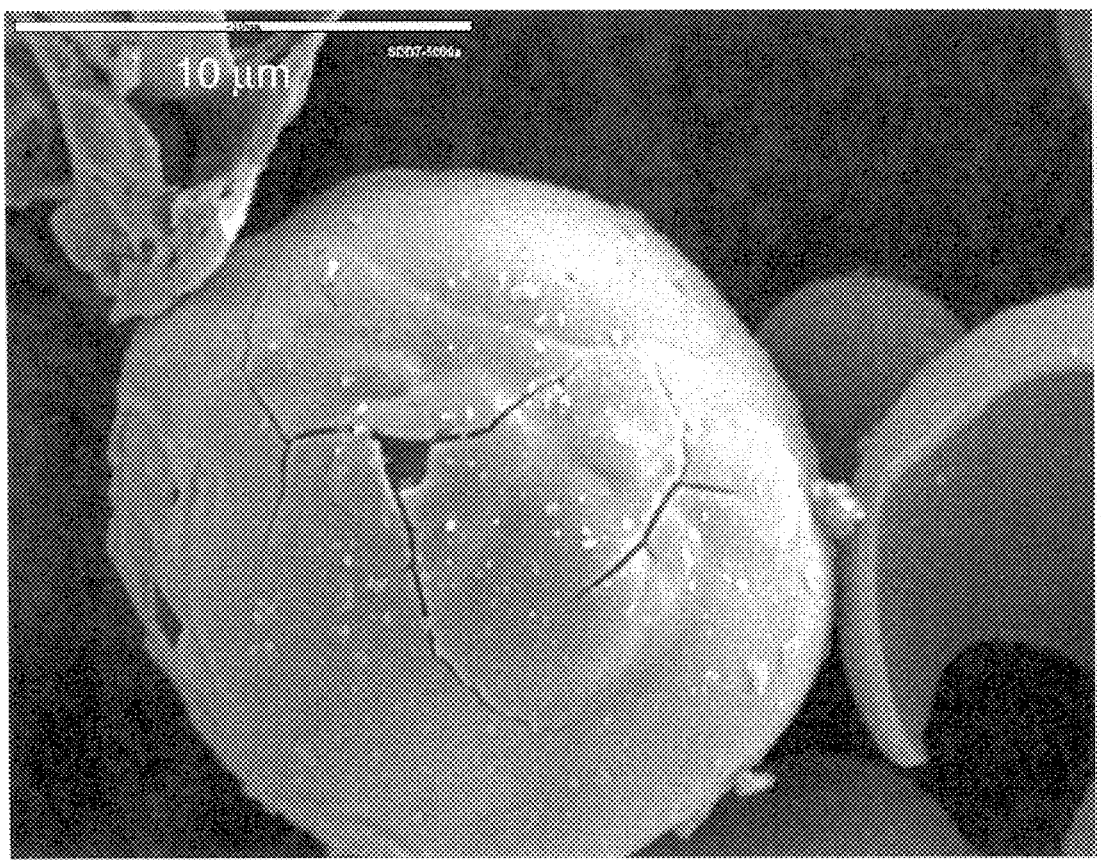
FIG. 4 is a photograph of titanium dioxide base material after spray hydrolysis at a temperature of 200° C. with no chemical control agents added to solution. The material was produced according to the present invention and is magnified 5,000 fold.

FIG. 4 shows an example of a titanium oxide particle that was produced by spray hydrolysis of a titanium containing solution at a temperature of 200° C.

Without being bound by any theory, it is believed that spray hydrolysis at a relatively low temperature yields an amorphous solid as a thin film that can readily be converted to pigment grade rutile or to anatase depending on the types of chemical controls introduced in the titanium chloride feed solutions and on the physical parameters utilized in the spray hydrolysis operation. Spray hydrolysis also has the advantage of direct processing of the solution so that the formation of titanium dioxide and evaporation of water and HCl are simultaneously accomplished.

Calcination

The titanium oxide product resulting from the spray hydrolysis operation is calcined at a temperature sufficient to convert the amorphous oxide to titanium dioxide of the desired crystal structure. Calcination temperatures can range between about 500° C. to over 1100° C. The calcination temperature is, however, less than that for which particle sintering occurs. Preferably, the calcination is conducted at temperatures ranging from about 800° C. to about 1000° C., and more preferably between about 900° C. and about 975° C.

During calcination, any residual chloride or residual organic carbon in the amorphous oxide feed is expelled as HCl or $CO_2$ gas.

Additionally and optionally, chemical control agents may be added to the amorphous oxide just prior to calcination to promote and control conversion of the oxide to the desired crystal structure and other physical characteristics such as crystal size and millability. These chemical control agents can be but are not limited to the chloride salts of lithium, sodium, potassium, aluminum, tin, and zinc. Carbonate salts, sulfate salts and fluoride salts of the same aforementioned elements may also be used. Additionally, phosphoric acid and/or phosphate salts of the aforementioned elements may be used. Furthermore, a number of organic additives may also be used. They include, but are not limited to: organic acids such oxalic, citric, stearic, etc.; salts from these organic acids and an inorganic compounds; other organic additives, such as polyacrylates, glycols, siloxane and their compounds.

Figure 5:
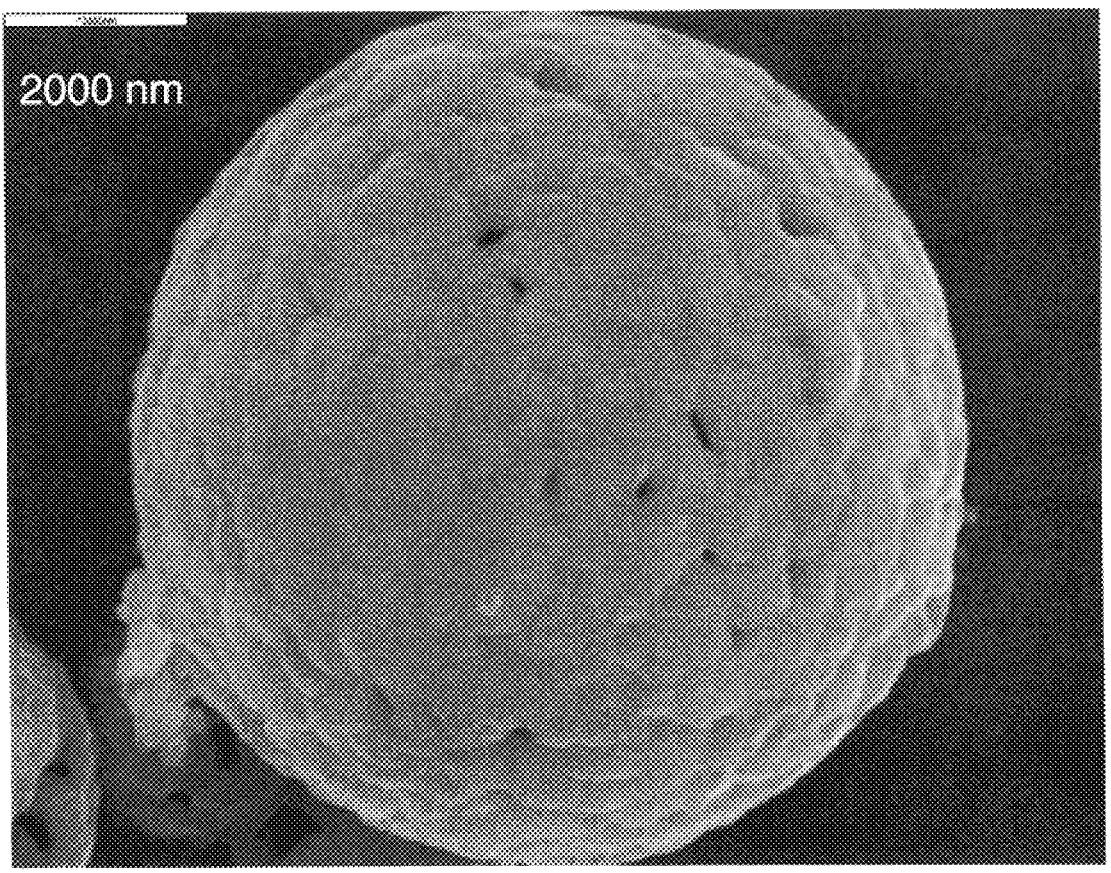
FIG. 5 is a photograph of a titanium dioxide base material after calcination at 900° C. for 1 hour and with no chemical control agents present. The base material was produced according to the present invention wherein the hydrolysis was accomplished by spray hydrolysis. The shown particle was magnified 5,000 fold.

FIG. 5 shows a photograph of a titanium dioxide base material that has been calcined at 900° C. for one hour with no chemical control agents present. The photograph shows that the amorphous surface of the spray dried titanium dioxide material particle (shown in FIG. 4) has been converted into a crystal-type structure. This particle can then be milled to break the crystal-type structure into the resulting titanium dioxide pigment particles.

Figure 6:
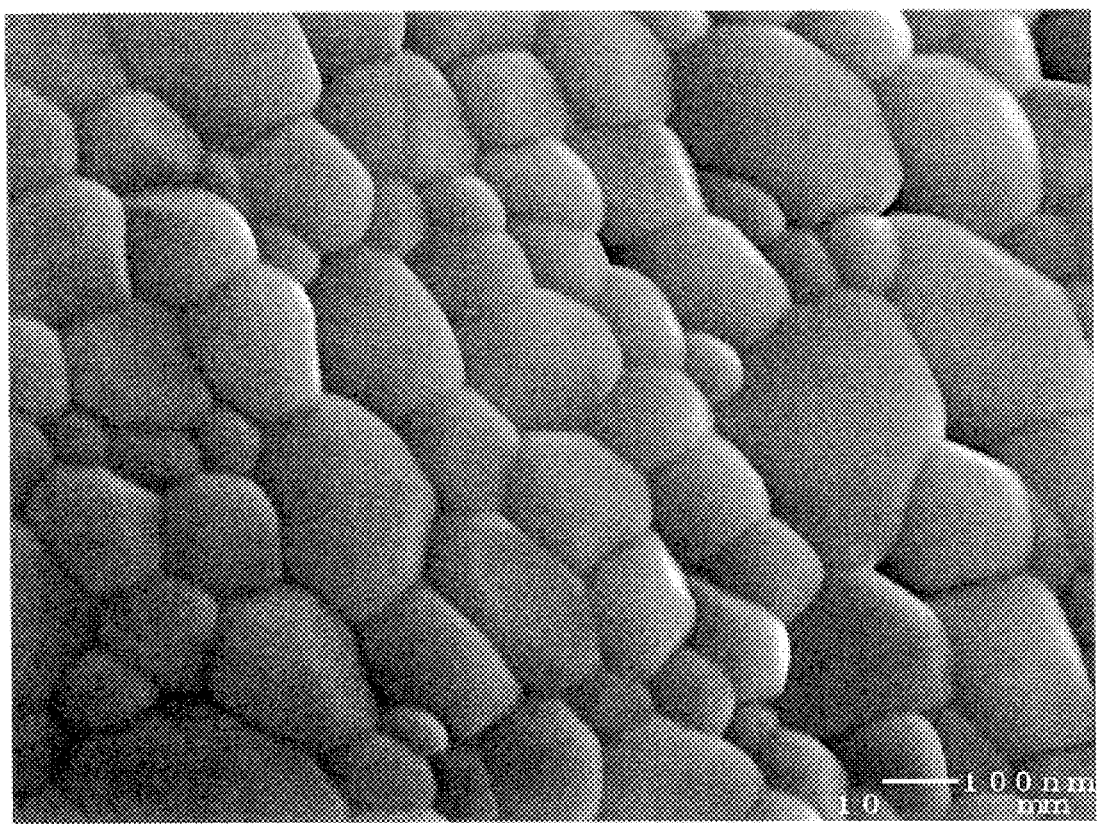
FIG. 6 is a photograph of a titanium dioxide base material after calcination at 920° C. for 2 hours and with an amount of phosphoric acid equivalent to 2% of the amount of $TiO_2$, added to the solution. The base material is anatase. It was produced according to the present invention wherein the hydrolysis was accomplished in a spray dryer. The shown particle was magnified 200,000 fold.

FIG. 6 shows a photograph of a titanium dioxide base material after calcination at 920° C. for 2 hours and with an amount of phosphoric acid equivalent to 2% of the amount of $TiO_2$, added to the solution. The base material is anatase. It was produced according to the present invention wherein the hydrolysis was accomplished in a spray dryer. The shown particle was magnified 200,000 fold.

Figure 7:
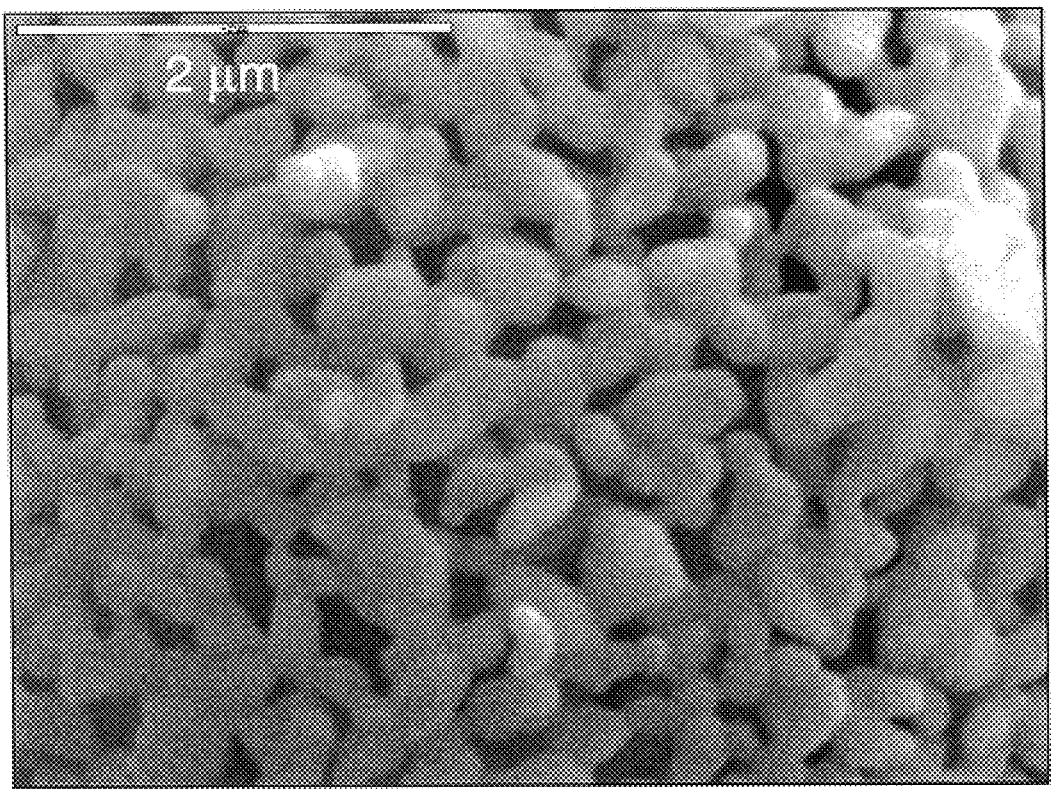
FIG. 7 is a photograph of a titanium dioxide base material after calcination at 920° C. for 90 min and with an amount of Sn equivalent to 1% of the amount of TiO2, added to the solution as $SnCl_2.2H_2O$. The base material is rutile and was produced according to the present invention wherein the hydrolysis was accomplished in a spray dryer. The shown particle was magnified 25,000 fold.

FIG. 7 is a photograph of a titanium dioxide base material after calcination at 920° C. for 90 min and with an amount of Sn equivalent of 1% of the amount of TiO2, added to the solution as $SnCl_2 \bullet 2H_2O$. The base material is rutile and was produced according to the present invention wherein the hydrolysis was accomplished in a spray dryer. The shown particle was magnified 25,000 fold.

Milling and Finishing

After calcination, the titanium dioxide contains greater than 99.5% of either anatase or rutile (not counting the chemical additives), depending on the conditions and chemical control agents used in spray hydrolysis/drying and calcination. In any event, the titanium dioxide is preferably finished to produce a white pigment suitable for commercial sale.

Figure 3:
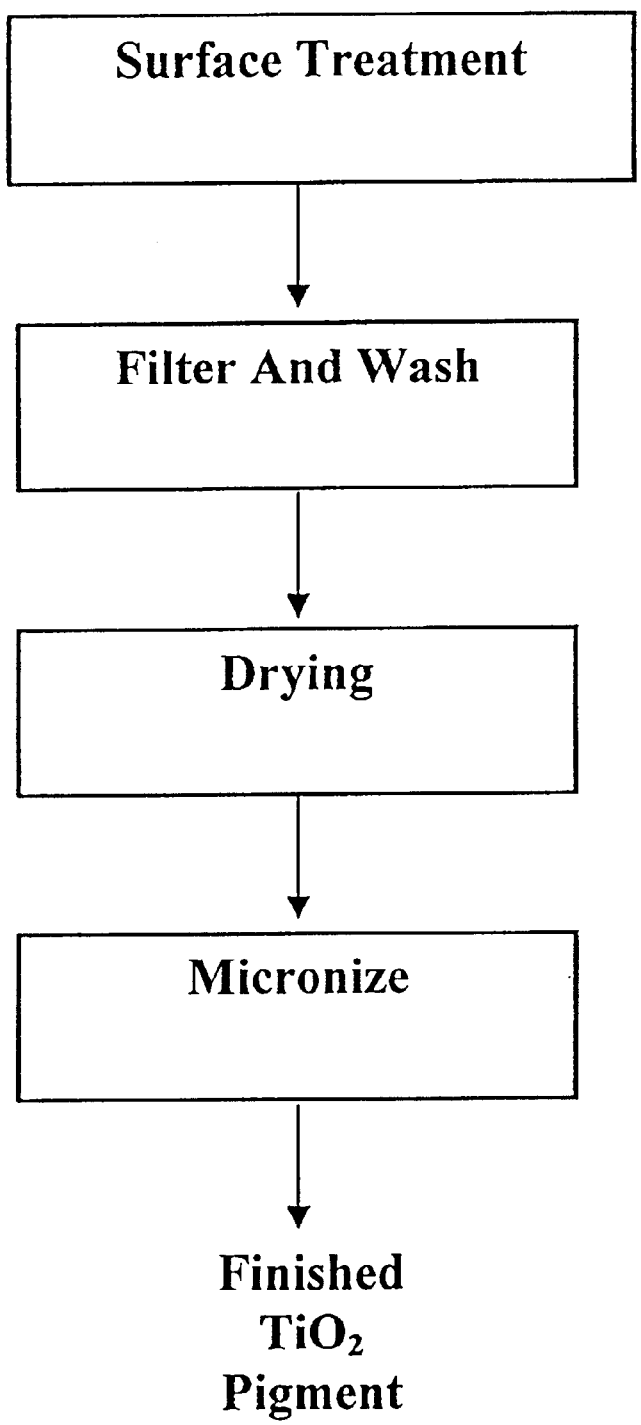
FIG. 3 is a flow sheet of a preferred finishing process.

The finishing process may include one or more of wet milling, filtering, washing, and packaging. In addition, the finishing can include a surface treatment step such as silica and alumina treatment, followed by spray drying and micronizing prior to packaging. The surface treatment step generally includes precipitating alumina, silica, zirconia, or other metal oxides, on the surface of the titanium dioxide. The purpose of this treatment is to impart photo stability, shelf life, dispersability, and flowability. FIG. 3 shows a preferred flow sheet of a finishing process The following examples illustrate, but do not limit, the present invention. Unless otherwise indicated, all parts and percentages are by weight.

Example I

A solution containing 53 g/l Ti and 210 g/l Cl was made according to the process described in U.S. Provisional Application Ser. No. 60/141,114. An amount of phosphoric acid equivalent to 2% of the amount of $TiO_2$ was added to the solution. The solution was fed to a spray hydrolyzer, consisting of a reaction chamber followed by bag filters and an HCl absorption system. The solution was injected at a rate of 2.25 liters/min through an atomizing disk. Gases from the combustion of natural gas, diluted with air to 550° C., were also injected around the disk. The outlet temperature was 250° C., and the total gas flow rate 800 scfm.

The product recovered on the bag filter was calcined at 920° C. for 2 hours. FIG. 6 is a scanning electron micrograph of the product after calcination, showing a particle size of the order of 250 nanometer. X-Ray diffraction analysis showed that the product is anatase.

Example II

The same solution used in Example I is used in the same conditions in the spray hydrolyzer and calciner, the only difference being than an amount of Sn equivalent to 1% of the amount of $TiO_2$ was added to the solution as $SnCl_2.2H_2O$ instead of phosphoric acid. FIG. 7 depicts a scanning electron micrograph of the product, showing elemental crystals of about 200 nanometer in size. X-Ray diffraction analysis shows that the product is rutile.

Example III

A number of small samples of solution were made by mixing a solution containing 53 g/l Ti and 210 g/l Cl with different additives. The main features are jointly presented in the following table. Except for the additives, the experimental conditions are the as those of Examples I and II. The following table summarizes the most significant results.

TABLE 1

| Chemical additive (as wt-% in $TiO_2$) | Added as | Average size of product particles (nanometer) | Crystal type |
|---|---|---|---|
| 1. 0.38% P, 6.3% Sn | $H_3PO_4$, $SnCl_2 \cdot 2H_2O$ | 150 | Rutile |
| 2. 2.7% P | $KH_2PO_4$ | 200 | Anatase |
| 3. 0.38% P, 0.2% $SiO_2$ | $H_3PO_4$, $Na_2SiO_3$ | 100–1000$_{(needles)}$ | Rutile |
| 4. 6.6% Sn | $SnSO_4$ | 200 | Rutile |
| 5. 9% Sn | $SnF_2$ | 200 | Rutile |

While there have been described what are presently believed to be the preferred embodiments of the invention, those skilled in the art will realize that changes and modifications may be made thereto without departing from the spirit of the invention. It is intended to claim all such changes and modifications that fall within the true scope of the invention.

What is claimed is:

1. A process for producing pigment-grade titanium dioxide from an aqueous titanium solution comprising:
   a. hydrolyzing the solution to form titanium oxide particles in a controlled temperature, evaporation process at a temperature higher than the boiling point of the solution;
   b. calcining the titanium oxide particles to remove residual water to form a desired titanium dioxide crystal structure selected from the group consisting of anatase and rutile; and
   c. milling the titanium dioxide.

2. The process of claim 1 wherein the titanium solution is a titanium chloride solution.

3. The process of claim 2 wherein the hydrolyzing step includes forming a hydrochloric acid and water mixture.

4. The process of claim 3 wherein the hydrochloric acid and water are recovered.

5. The process of claim 2 wherein the titanium chloride solution is concentrated by vacuum evaporation before hydrolysis.

6. The process of claim 2 wherein the titanium chloride solution is derived from chlorination of a titanium containing ore.

7. The process of claim 1 wherein the titanium solution is a titanium or titanyl sulfate solution.

8. The process of claim 7 wherein the hydrolyzing step includes forming a sulfuric acid and water mixture.

9. The process of claim 2 wherein the titanium chloride solution is concentrated by vacuum evaporation before hydrolysis.

10. The process of claim 1 wherein the titanium solution is a titanium or titanyl nitrate solution.

11. The process of claim 10 wherein the hydrolyzing step includes forming a nitric acid and water mixture.

12. The process of claim 11 wherein the nitric acid and water are recovered.

13. The process of claim 1 wherein the hydrolysis step is conducted at a temperature between about 120° C. and about 350° C.

14. The process of claim 1 further comprising the successive steps of washing, filtering, and drying the milled titanium dioxide.

15. The process of claim 1 wherein the hydrolyzed titanium oxide is produced by spraying in a reactor.

16. The process of claim 15 wherein the reactor is a spray dryer.

17. The process of claim 16 wherein the operating temperatures used in the spray dryer are between about 120° C. and about 350° C.

18. The process of claim 16 wherein the calcining is performed at a temperature between about 800° C. and about 1000° C.

19. The process of claim 15 wherein the titanium oxide is a substantially spherical thin membrane.

20. The process of claim 19 wherein the average diameter of the titanium oxide spherical membrane is between about 1 and about 100 microns.

21. The process of claim 19 wherein the membrane thickness is between about 0.1 microns and about 5 microns.

22. The process of claim 15 wherein the calcining is performed at a temperature between about 800° C. and about 1000° C.

23. The process of claim 1 further comprising adding a chemical control agent to the titanium solution before hydrolysis and drying.

24. The process of claim 23 wherein the chemical control agent is selected from the group consisting of metal salts and acids comprising metal chloride, metal fluoride, metal sulfate, metal carbonate, metal phosphate, phosphoric acid, and mixtures thereof.

25. The process of claim 23 wherein the chemical control agent is selected from the group consisting of organic acids, salts of the organic acids, inorganic compounds, and organic additives wherein the organic acids are selected from the group consisting of polyacrylates, glycols, siloxanes, and mixtures thereof.

26. The process of claim 23 wherein the chemical control agent is a salt having a cation selected from the group consisting of lithium, sodium, potassium, aluminum, tin, zinc, and mixtures thereof.

27. The process of claim 1 wherein the calcining is performed at a temperature between about 500° C. and about 1100° C.

28. The process of claim 1 wherein the calcining is performed at a temperature between about 900° C. and about 975° c.

29. A process for producing pigment-grade titanium dioxide from an aqueous titanium solution comprising:
   a. hydrolyzing the solution to form titanium dioxide particles having a substantially spherical thin membrane by spraying in a reactor at a temperature higher than the boiling point of the solution;
   b. calcining the titanium dioxide particles to remove residual water; and
   c. milling the titanium dioxide.

30. The process of claim 29 wherein the average diameter of the titanium oxide spherical membrane is between about 1 and about 10 microns.

31. The process of claim 29 wherein the membrane thickness is between about 0.1 microns and about 5 microns.

32. A process for producing pigment-grade titanium dioxide from an aqueous titanium solution comprising hydrolyzing the solution by spraying in a reactor at a temperature higher than the boiling point of the solution to form a titanium dioxde and calcining the titanium oxide to remove residual water.

33. A process for producing pigment-grade titanium dioxide from an aqueous titanium solution comprising hydrolyzing the solution to form a titanium oxide in an evaporation process at a temperature higher than the boiling point of the solution by spraying in a reactor and thereafter calcining the titanium oxide to remove residual water.

34. A process for producing pigment-grade titanium dioxide from an aqueous titanium solution comprising hydrolyzing the solution to form a titanium oxide in an evaporation process at a temperature higher than the boiling point of the solution by spraying in a reactor and thereafter calcining the titanium oxide to remove residual water, wherein titanium dioxide having a desired crystal structure selected from the group consisting of anatase and rutile is formed.

* * * * *